J. P. BRYAN.
Corn-Coverer.
No. 3,151.
Patented June 24, 1843.
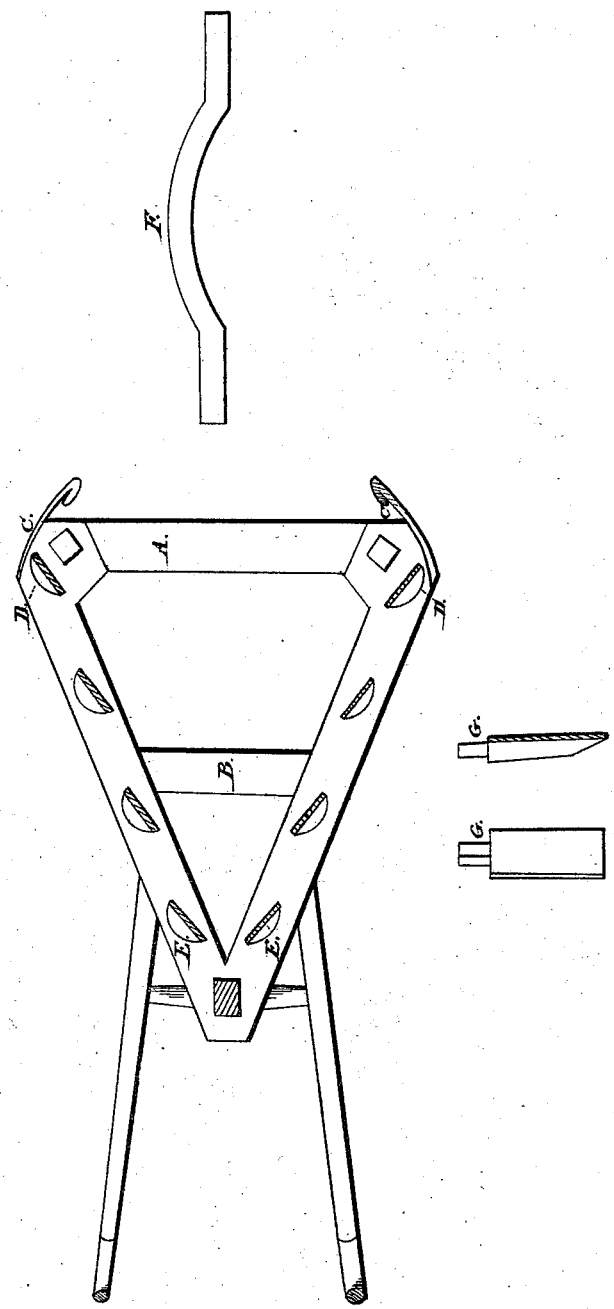

UNITED STATES PATENT OFFICE.

JNO. P. BRYAN, OF PRINCETON, KENTUCKY.

IMPROVEMENT IN CANE-COVERERS.

Specification forming part of Letters Patent No. 3,151, dated June 24, 1843.

*To all whom it may concern:*

Be it known that I, JOHN P. BRYAN, of Princeton, in the county of Caldwell and State of Kentucky, have invented a new and useful Machine for Covering Sugar-Cane, Corn, or Cotton in the act of Planting, which machine is called "Bryan's Patent Cane-Coverer;" and I do hereby declare that the following is a full, clear, and exact description of the construction and operation of the same, reference being had to the annexed drawing, making a part of this specification.

The machine is made in a triangular form, of light scantling, five or six feet wide in front, according to the width of the furrows, the letter A representing the front bar, with two bolts or hooks at C, to which the teams are hooked, the sides converging to a point, and each pierced with ten or twelve cogs or teeth six inches apart, which will unite in gathering soil and transmitting it along the whole line from D to E in such quantity as will effectually cover the seed, the teeth having the plane surface inside.

The cross-bar of the frame in front is curved upward, F, to prevent it from scraping the soil away from the action of the teeth.

The second cross-bar, B, of the frame serves to unite the sides and to form a support for the handles, which are like plow-handles.

The teeth are of cast-iron, and are represented at letter G. They are about nine inches long, three inches wide, one side plane, the other convex, one inch thick at the shoulder, and tapering to a sharp edge at the bottom and sides.

What I claim as my invention, and desire to secure by Letters Patent, is—

The form of the teeth and the manner of arranging them in the triangular frame to present the flattened side of each to the earth by advancing one side of the triangle as a front bar instead of the angle or point, as is usually done.

JNO. P. BRYAN.

Witnesses:
P. LATHROP,
FRS. ROBERTS.